United States Patent [19]
Funahashi

[11] Patent Number: 5,432,575
[45] Date of Patent: Jul. 11, 1995

[54] MECHANISM FOR LOCKING CARTRIDGE COMPARTMENT COVER OF CAMERA

[75] Inventor: Akira Funahashi, Sakai, Japan

[73] Assignee: Minolta Camera Kabushiki Kaisha, Osaka, Japan

[21] Appl. No.: 205,171

[22] Filed: Mar. 3, 1994

[30] Foreign Application Priority Data

Mar. 5, 1993 [JP] Japan .................................. 5-045099

[51] Int. Cl.$^6$ .............................................. G03B 17/02
[52] U.S. Cl. ................................. 354/195.1; 354/288
[58] Field of Search ............... 354/288, 275, 281, 174, 354/195.1, 214

[56] References Cited

U.S. PATENT DOCUMENTS

| 3,096,699 | 7/1963 | Harvey et al. | 354/288 X |
| 4,572,641 | 2/1986 | Ishihara et al. | 354/288 X |
| 4,714,335 | 12/1987 | Desormeaux | 354/288 X |
| 4,887,114 | 12/1989 | Yamamoto et al. | 354/288 |
| 5,231,438 | 7/1993 | Smart | 354/281 |
| 5,258,793 | 11/1993 | Tsuji et al. | 354/288 |

FOREIGN PATENT DOCUMENTS

| 54-128732 | 10/1979 | Japan . |
| 55-46732 | 4/1980 | Japan . |
| 2-21634 | 2/1990 | Japan . |
| 3-267933 | 11/1991 | Japan . |
| 4-159527 | 6/1992 | Japan . |

Primary Examiner—Michale L. Gellner
Assistant Examiner—J. K. Han
Attorney, Agent, or Firm—Burns, Doane, Swecker & Mathis

[57] ABSTRACT

A camera includes a camera body, the camera body including a cartridge compartment, the cartridge compartment having a cover, the cover being movable between an open and a closed position. The camera includes a lock mechanism, the lock mechanism having a locking state in which the cover is prevented from being moved to the open position from the closed position, even if an operation to open the cover is executed, and an unlocking state in which the cover is movable from the closed position to the open position. The camera further includes a drive mechanism which drives a photographing lens, and an actuating mechanism, the actuating mechanism being movable between a first and a second position of the actuating mechanism by the drive mechanism. The actuating member switches the lock mechanism to the locking state when the drive mechanism moves the actuating mechanism to the first position of the actuating mechanism. The lock mechanism is switched to the unlocking state when the drive mechanism moves the actuating mechanism to the second position of the actuating mechanism.

19 Claims, 9 Drawing Sheets

MECHANISM FOR LOCKING CARTRIDGE COMPARTMENT COVER OF CAMERA

BACKGROUND OF THE INVENTION

1. Field of the Invention

The present invention generally relates to an apparatus such as a camera, and particularly relates to a mechanism for locking a cover of a cartridge compartment of the camera which prevents the cover from being opened when the camera is loaded with a cartridge so that a film of the cartridge is prevented from being exposed to light carelessly.

2. Description of the Related Art

Conventionally, there have been provided various types of locking mechanisms for locking a cover of a film cartridge compartment in order to prevent the cover from unlocking carelessly, as shown in Japanese Laid-Open Patent (Unexamined) Publication Nos. 55-46732 and 54-128732.

According to the invention disclosed in the former Publication, the locking mechanism has a construction in which the spool for winding the film has a small diametric part and in which a lever is mounted in such a way that the lever is biased so that the small diametric part of the spool is pushed by the tip of the lever. With this construction, when the film is wound around the spool through the tip of the lever and the small diametric part of the spool, the lever tilts and the mechanism for opening and closing the cover is locked, moving with the lever.

On the other hand, according to the locking mechanism disclosed in the latter Publication, there is provided a sensor or the like, and the mechanism for opening and closing the cover is locked by employing a magnet or the like when the film is detected by the sensor.

The former locking mechanism, however, has a disadvantage that the cover may not be locked certainly, especially if the film does not have a uniform flexural strength, because as the film is wound around the spool, the film is pressed towards the outer surface of the small diametric part of the spool by the tip of the lever, thus letting the film bend. In addition, the former locking mechanism has another disadvantage in that the film may get scratches on it or it may be difficult to get sufficient flatness in the frame set ready for picture taking is because the film is pressed by the lever. On the other hand, because the latter locking mechanism employs an actuator like a magnet in exclusive use for it in order to lock the cover, such problems as high cost of production and large camera size occur.

In the meanwhile, there has been conventionally proposed a thrust-type of cartridge being constructed so that the film thereof is wound up to the tip of the leader inside the film case when the cartridge is not set inside a camera and that the film is thrust and fed out of the film cartridge by a mechanism, for feeding the film, provided on the side of the camera when the cartridge is set inside the camera, and the film fed therefrom is wound around the spool of the camera. If the camera is of the type in use for the thrust-type of cartridge, it is possible to make the cartridge compartment cover relatively smaller and to provide the cover on either the upper or lower surface of the camera body because the cartridge may be inserted in and taken out of the cartridge compartment in an axial direction of the spool. In this type of camera, if the user opens the cartridge compartment cover and tries to take the film cartridge out of the cartridge compartment by force when the film is fed out of the cartridge, not only is the film exposed to light, but it is also possible that the film will tear and that torn pieces of the film will remain inside the camera. If this happens, since the cartridge compartment cover is small, it is difficult for the user to remove the remains of film from the cartridge compartment, and it may be necessary to repair the camera.

Furthermore, Japanese Laid-Open (Unexamined) Patent Publication No. 3-267933, proposes a thrust-type of cartridge constructed so that a member having an indicator on it is integrally mounted to the cartridge spool and rotates together with it, that marks of "EXPOSED", "UNEXPOSED" or the like which display how the film is used are shown on the cartridge case, and that the indicator points to either of these displaying marks, depending upon the state of the film, by controlling the stopping position of the cartridge spool at the time of rewinding the film. In this type of cartridge, if the cartridge is taken out of the camera before the positioning of the indicator with respect to a predetermined displaying mark is completed, the indicator points to a wrong display mark. In order to prevent this wrong indication, it is preferable to prevent the cartridge compartment cover from opening unnecessarily. That is, in cameras employing the thrust-type of cartridge, it is desirable to prevent the cover from opening unnecessarily.

SUMMARY OF THE INVENTION

It is an object of the present invention to provide a mechanism, for locking a cartridge compartment cover, by which not only the cover is surely prevented from opening when the film is fed out of the cartridge case, but also permits minimization of camera size and permits avoiding high costs of production.

In accomplishing this and other objects of the present invention, there is provided a mechanism for locking a cartridge compartment cover of a camera. The mechanism includes a lock mechanism selectively having a locking state that a cartridge compartment cover is prevented from being opened and an unlocking state that the cover can be opened, a drive mechanism which drives a photographing lens, and an actuating mechanism, actuated by the drive mechanism, which switches the lock mechanism between the locking state and the unlocking state.

In the above mechanism, by actuating the actuating mechanism by the drive mechanism to make the lock mechanism take the locking state, the cover is prevented from being opened, while by actuating the actuating mechanism to make the lock mechanism take the unlocking state, the cover can be opened. That is, careless opening of the cover can be prevented by controlling the drive mechanism, which may be a motor, so that the cover can be opened only at the time of necessity. Thus, according to the mechanism, because the lock mechanism is operated by the drive mechanism via the actuating mechanism without employing any special actuator, and the photographing lens is driven by the drive mechanism working with the actuating mechanism, the cover is surely locked except at the time that it is necessary that the cover is opens. Accordingly, the film is certainly prevented from being exposed to light even if the camera happens to be misused, and the camera's becoming large-sized and high cost of its production are surely prevented.

Preferably, the lock mechanism has a locking member movable between a locking position at which the cover is kept closed and an unlocking position at which the cover can be opened, and the photographing lens is moved, by the drive mechanism, between a photographing position at which the lens projects from a camera body of the camera and a retracting position at which the lens retracts from the photographing position into the camera body. In this mechanism, by setting the locking member in the locking position when the photographing lens is moved to the photographing position or to the retracting position, and by constructing its lens barrel so that the locking member is set to the unlocking position when the lens barrel is positioned in some region, which is used as a region for taking the film cartridge out, with the photographing lens being set in the retracting position, the cover can be surely locked at the time of picture taking or at the time of the camera not being used with the film cartridge being inside the camera. Also, the mechanism can be constructed so that the lens barrel is driven in a direction opposite to a direction in which the photographing lens is moved from the retracting position to the photographing position or the lens barrel is positioned in the abovementioned region corresponding to the region for taking the film cartridge out, in order to set the locking member in the unlocking position.

Preferably, the lock mechanism has a knob member operated manually for opening and closing the cover; and the camera body has a first switch for detecting a state of the knob member, a second switch for detecting an opening/closing state of the cover, and a third switch for detecting that a film cartridge is loaded in a cartridge compartment, wherein the lens is driven so that the cover is kept in the closing state in case that the knob member being set in a state for closing the cover is detected by the first switch, that the cover being in the closing state is detected by the second switch, and that the film cartridge being loaded in the cartridge compartment is detected by the third switch.

Preferably, the camera has a rewind mechanism which rewinds the film wherein an indicator, which is provided in the film cartridge to indicate whether the film is exposed or unexposed, is operated so as to indicate that the film is taken out from the camera before the film is completely used, and the photographing lens is driven so that the cover is set in the opening state, in case that the film is rewound, by the rewinding mechanism, before the film is completely used, and/or the camera has a detect mechanism which detects a terminal end of the film, wherein the indicator is operated so as to indicate that the film is taken out after the film is completely used, and the photographing lens is driven so that the cover is set in the opening state, in case that the terminal end of the film is detected by the detect mechanism.

BRIEF DESCRIPTION OF THE DRAWINGS

The features of the present invention will become clear from the following description taken in conjunction with the preferred embodiments thereof with reference to the accompanying drawings, wherein like parts are designated by the reference numerals and in which.

DETAILED DESCRIPTION OF THE INVENTION

Referring to FIGS. 1 through 9, a full description of a mechanism for locking a cartridge compartment cover of a camera according to the first embodiment of the present invention is made below. A lens barrel mounted in the camera according to a preferred embodiment is constructed as a collapsible barrel in order to reduce the amount that the lens barrel projects from the camera body when the camera is not used, and a camera has the mechanism for locking the cartridge compartment cover by which an operation of opening or closing the cover is controlled, moving with the lens barrel.

Figure 12:
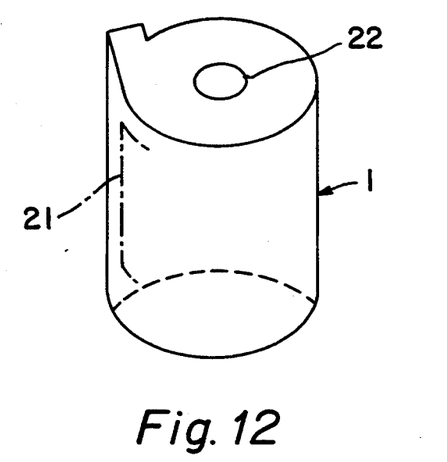
FIG. 12 is a perspective view of a film cartridge.
Figure 13:
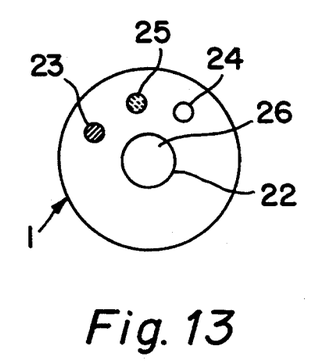
FIG. 13 is an end view of film cartridge having an indicator thereon.

A film cartridge 1 used in this camera is a thrust-type of cartridge and is constructed such that the film (21) thereof is wound up to a tip of a leader inside the film case when the cartridge is not set inside the camera (FIG. 12); and such that the film is thrust and fed out of the film cartridge by a mechanism, for feeding the film, provided in the camera when the cartridge is set inside the camera, and the film fed from the cartridge is wound around a spool of the camera. In order to display whether frames of the film are all unexposed, all exposed, or partly exposed to light when the film cartridge is taken out of the camera, three displaying marks corresponding to the "all unexposed" (23), "all exposed" (24) and "partly exposed" (25) are shown on a case of the film cartridge 1 while a member having an indicator (26) on it is mounted in a spool (22) of the film cartridge 1 (FIG. 13). With this construction, the indicator of the spool points to either of a three displaying marks by controlling the stopping position of the cartridge spool with a mechanism for feeding the film at the time of rewinding the film.

Figure 1:
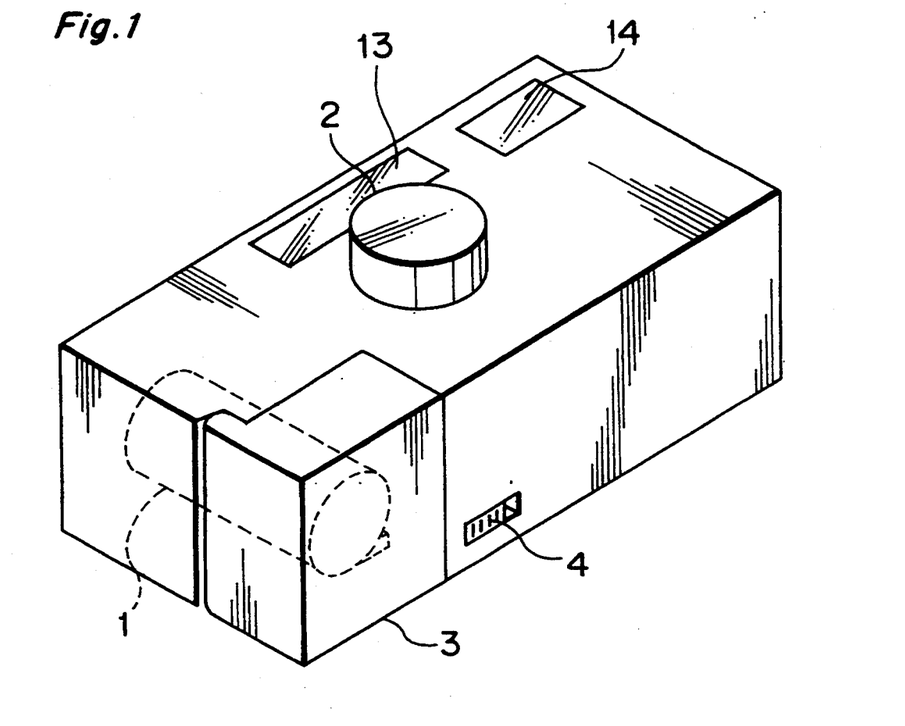
FIG. 1 is a perspective view of a camera provided with a mechanism for locking a cartridge compartment cover according to the first embodiment of the present invention.
Figure 2:
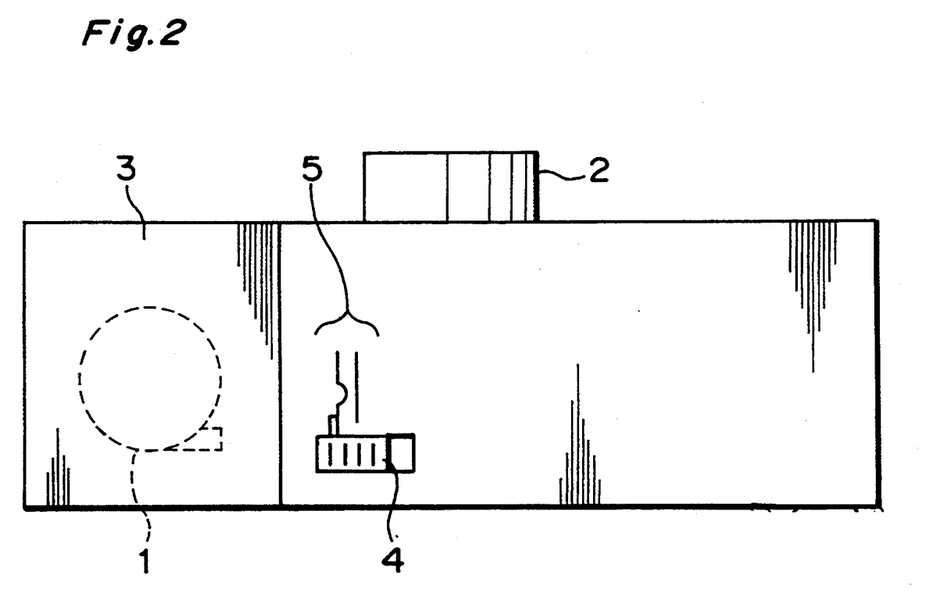
FIG. 2 is a bottom view of the camera shown in FIG. 1.

FIG. 1 is a perspective view of the camera, and FIG. 2 is a bottom view of the camera shown in FIG. 1. The camera has a cartridge compartment cover 3 at a part of a left, lower corner of the camera body with respect to the front view thereof, and the film cartridge 1 is put in and out in an axial direction of the cartridge spool relative to a cartridge compartment positioned corresponding to the cover 3. This cover 3 is kept closed when an opening and closing lever 4, provided as an actuating member near the cover 3, for opening and closing the cover 3 is set in a position (a first position) as shown in the figure, while the cover 3 can be opened when the lever 4 is moved to a predetermined position (a second position) to the right of the first position. When moving the lever 4 to the second position, a left contact, as shown in FIG. 2, provided in a detection switch 5 for detecting the operation of the lever 4, is pushed to a right contact of the detection switch 5. As a result, an electric signal is generated, and this signal is used to control the operation of the camera. In the figures, a reference numeral 13 indicates a finder and a photometric/focusing unit, and a numeral 14 indicates a flash.

Figure 3:
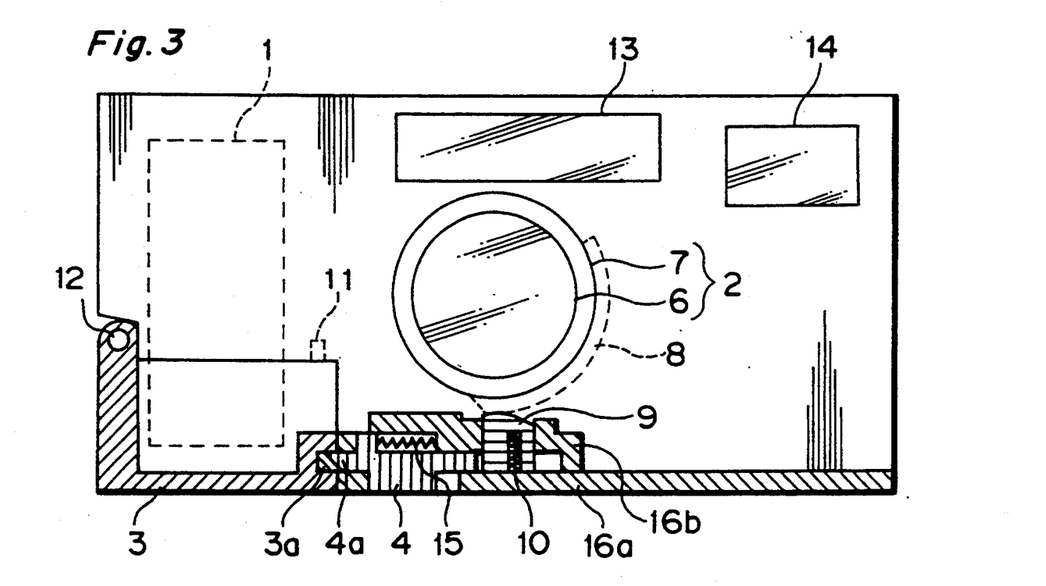
FIG. 3 is a partially sectional front view of the camera, of FIG. 1, showing the mechanism for locking the cartridge compartment cover with the cover being locked to the camera body.
Figure 4:
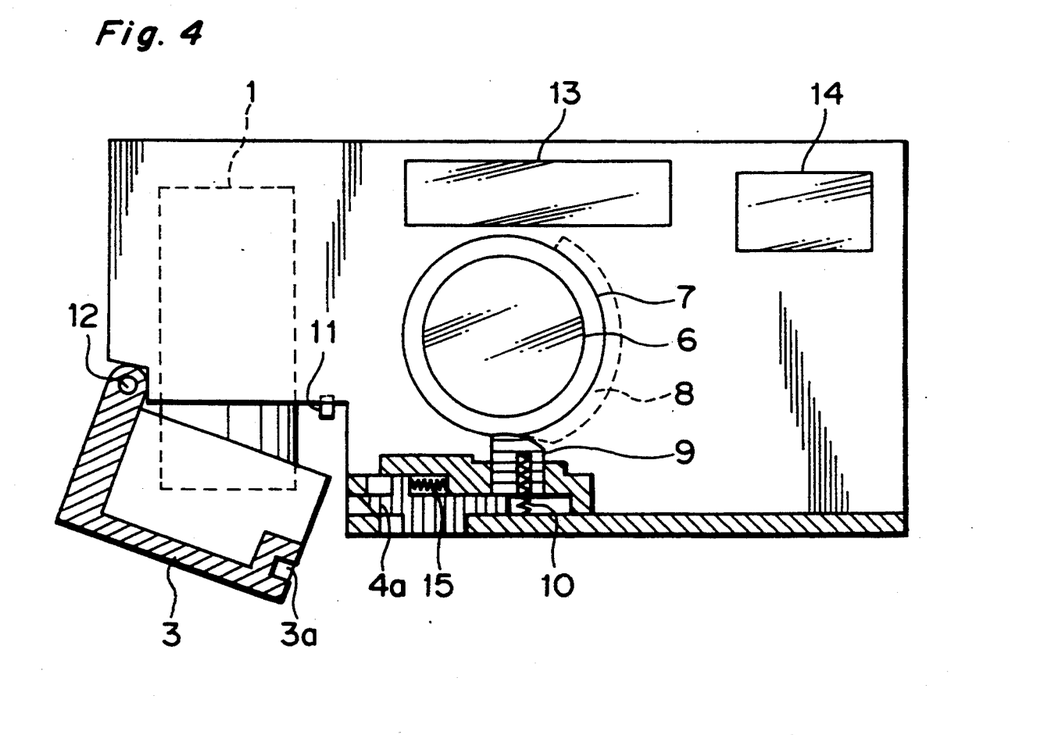
FIG. 4 is a partially sectional front view, similar to FIG. 3, showing that the cover is unlocked from the camera body.

FIG. 3 is a partly sectional front view of the camera, showing a state in which the cartridge compartment cover 3 is locked, and FIG. 4 is a front view similar to FIG. 3, showing a state in which the cover 3 is unlocked.

The photographing lens barrel 2 comprises a rectilinear barrel 6 able to perform advance and retreat movement in a direction of its optical axis, and a rotatable barrel 7 able to rotate around the rectilinear barrel 6, which is driven by a barrel-driving motor DR2 (See FIG. 5.) via a speed-reduction mechanism not shown in the figure. Also, there is provided a cam mechanism, not shown in the figure, between the rectilinear barrel 6 and the rotatable barrel 7 in order to transform a rotational movement of the rotatable barrel 7 into a rectilinear movement of the rectilinear barrel 6. With this construction, it is made possible to drive the photographing lens by moving the rectilinear barrel 6 in the direction of the optical axis when actuating the motor DR2.

As mentioned above, the photographing lens barrel 2 is constructed to be of a collapsible type, the barrel 2 being movable between a photographing position and a position in which the barrel 2 is housed inside the camera body. The cam mechanism has one rotational range which allows the rectilinear barrel 6 to move between the photographing position and the position in which the barrel 2 is housed inside the camera body, and another rotational range, formed as a flat part, which allows the rotatable barrel 7 to rotate with the rectilinear barrel 6 being kept in the position taken when the barrel 2 is housed inside the camera body.

The cartridge compartment cover 3 is pivotally mounted in the camera body by a pin 12, thus permitting the cover 3 to open and close with respect to the camera body. The cover 3 has a locking recess 3a, and the opening and closing lever 4 has a locking projection 4a able to engage with and to be released from the locking recess 3a. The opening and closing lever 4 is biased by a spring 15 in a direction such that the locking projection 4a projects from a side wall of the camera body, the side wall forming the cartridge compartment, i.e., the lever 4 is biased to the left as seen in the FIG. 3. When the cover 3 is handled, and the locking projection 4a is locked to the locking recess 3a, the cover is kept closed. On the other hand, the cover 3 can be opened when the locking projection 4a is unlocked from the locking recess 3a by sliding the opening and closing lever 4 to the right as seen in FIG. 14. A detection switch 11 is provided in the cartridge compartment which moves together with the cover 4, for detecting if the cover 4 is opened or closed.

A locking member 9 is provided under the photographing lens barrel 2 the locking member being supported by a pair of members 16a, 16b on the side of the camera body the locking member being movable up and down with respect to the camera body as seen in FIGS. 3 and 4. A locking cam is formed on the peripheral outer surface of the rotatable barrel 7 which enables the locking lever 9 to go above the opening and closing lever 4 when the rotatable barrel 7 is in a predetermined rotational range (i.e., a position to unlock the cover 3) to prevent the rectilinear barrel 6 from being driven and which enables the locking lever 9 to be pushed down when the rotatable barrel 7 is in a predetermined rotational range (i.e., a position to lock the cover 3) to allow the rectilinear barrel 6 to be driven and projected from the camera body. The operation of the opening and closing lever 4 is inhibited when the cover 3 is closed and the locking member 9 is pushed down (See FIG. 3.), while the operation of the lever 4 is allowed when the locking member 9 is above the lever 4 (See FIG. 4.).

Figure 5:
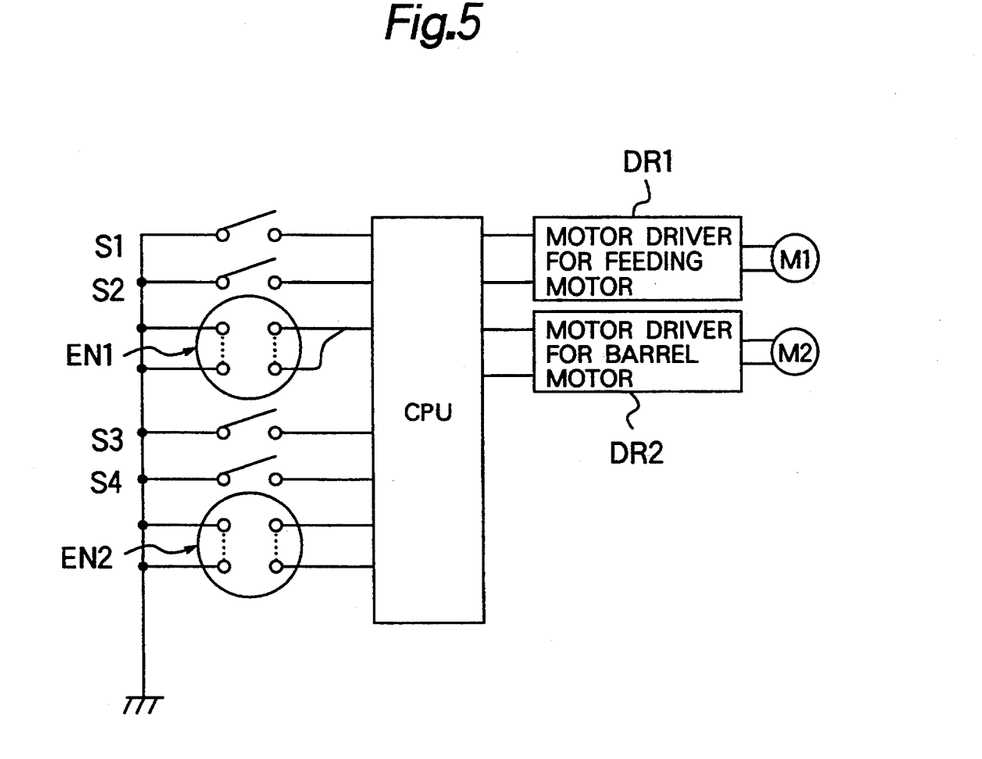
FIG. 5 is a block schematic diagram showing a construction of a circuit of the camera shown in FIG. 1.

Next, referring to FIG. 5, a description of a schematic construction of circuit used in the camera is made below.

In the figure, CPU is a microcomputer controlling the operation of the camera, DR1 and DR2 are motor drivers for a film-feeding motor M1 and a barrel-driving motor M2, respectively. S1 is the detection switch, for detecting the operation of the lever 4, shown by the numeral 5 in FIG. S2 is the detection switch 11, shown in FIGS. 3 and 4, for detecting if the cover 3 is opened or closed, S3 is a rewinding switch, operated by the user of the camera, for rewinding the film, S4 is a detection switch for detecting if the film cartridge 1 is put inside the cartridge compartment; EN 1 is an encoder to detect the position of the lens barrel 2; EN2 is another encoder to detect the position of a fork engaging with the cartridge spool.

Figure 6:
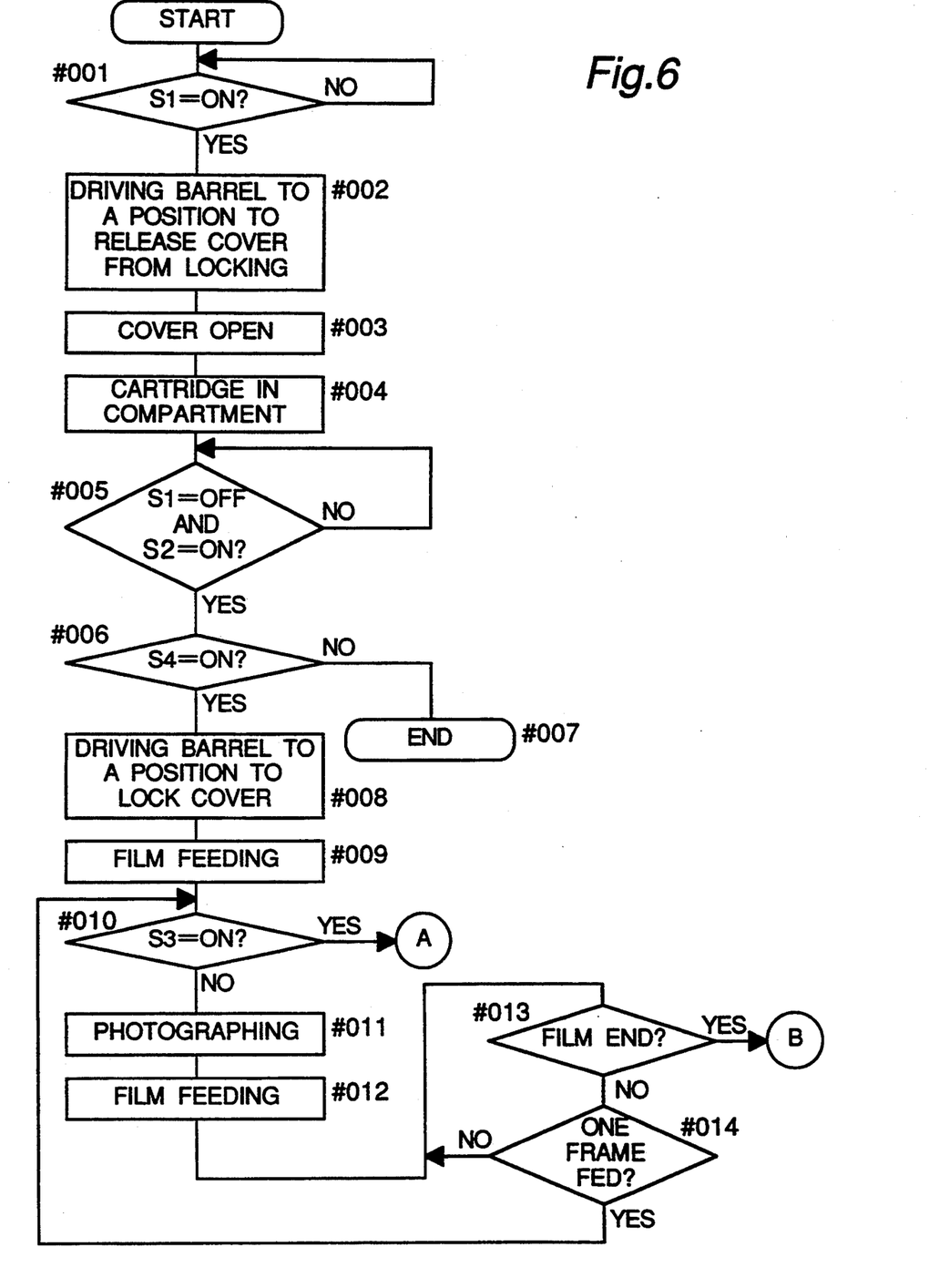
FIG. 6 is a flow chart showing an operation of the camera shown in FIG. 1.

Now, referring to flow charts shown in FIGS. 6 and 7, a description of the operation of the camera is made below.

First, at step #001, it is decided whether or not the detection switch S1 is turned on. If the switch S1 is turned on at this step, it proceeds to step #002 at which the motor M2 is operated so that the photographing lens barrel 2 comes to the position at which the cartridge compartment cover 3 is unlocked. If it is detected that the cover 3 is unlocked at this step, the camera can be loaded with the film cartridge 1 by opening the cartridge compartment cover 3 at steps #003 and #004.

Next, at step #005, it is decided whether or not the detection switch S1 is turned off and the detection switch S2 is turned on, and when it is decided at this step that the cover 3 is closed and that the locking projection 4a and the locking recess 3a engage with each other, it proceeds to step #006 for detecting whether or not the film cartridge 1 is put in the cartridge compartment by judging an output signal from the detection switch S4. At this step #006, if it is decided that the film cartridge 1 is not put in the cartridge compartment, it proceeds to step #007 for ending the operation. If it is decided at the step, however, that the film cartridge 1 is put in the cartridge compartment, it proceeds to step #008 at which the motor M2 is operated so that the photographing lens barrel 2 comes to the position that the cartridge compartment cover 3 is locked.

Next, at step #009, the film-feeding motor M1 is operated to start feeding the film, and then the first frame of the film is set ready for picture taking. Next, it is decided at step #010 whether or not the switch S3 for rewinding the film is handled by the user, and if it is decided that the switch S3 is turned on, it proceeds to step #015 shown in FIG. 7 but, if it is decided that the switch is turned off, it proceeds to step #011. Incidentally, it is also possible to construct the camera such that the operation of rewinding the film can be performed by handling the opening and closing lever 4 and such that it is decided whether the switch S1 is turned on or off at this step #010.

If it is decided that the switch S3 is not turned on at step #010, the operation of picture taking by handling a release button and by actuating the photometric, focussing and shutter controlling unit is performed at step #011. After photographing, the film is fed by a frame by operating the film-feeding motor M1 at step #012, and then it is decided whether or not the film is fed up to the terminal end thereof at step #013. If it is decided that the film is not fed up to its terminal end, after making sure that the film is fed by the frame at step #014, it proceeds back to the step #010 for repeating the same operation. In other words, every time one frame of the film is photographed, it is decided whether or not the switch S3 for rewinding the film is handled.

If it is decided at step #010 that the switch S3 is handled, it proceeds to step #015 at which the film-feeding motor M1 is reversed to rewind the film. And, at step #016, the film feeding mechanism is controlled by using an output signal from the fork encoder so that the indicator fixed to the cartridge spool is positioned with respect to the displaying mark, of the cartridge case, corresponding to the "partly exposed". In the meantime, if it is decided that the switch S3 is not handled at step #010 and that the film is fed up to the terminal end thereof at step #013, after rewinding the film at step #017, it proceeds to step #018 at which the film feeding mechanism is controlled so that the indicator of the cartridge spool points to the displaying mark corresponding to the "exposed".

After the stopping position of the cartridge spool is controlled as described above, at step #019, the barrel motor M2 is operated to drive the rotational barrel 7 until the locking member 9 goes up and retreats from the opening and closing lever 4. Then, at steps #020 and #021, the cartridge compartment cover 3 is opened and the cartridge may be taken out of the camera.

Figure 8:
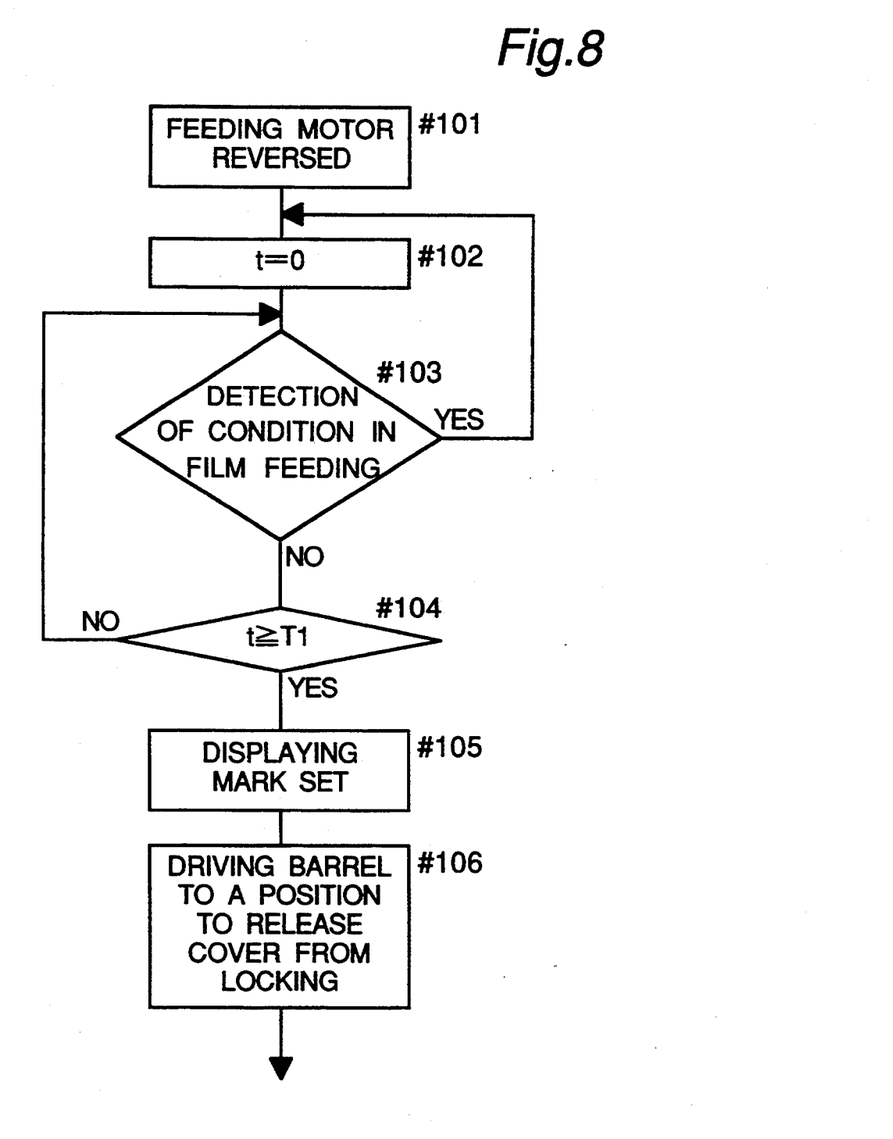
FIG. 8 is a flow chart according to one modified embodiment of the present invention.

The abovementioned steps #015 through #019 are carried out according to a flow chart shown in FIG. 8. First, rewinding the film is performed by reversing the film-feeding motor M1 at step #101. Next, after resetting a measuring time t of a timer to zero, the time starts to be counted. At step #103, it is decided whether or not the film is outside the film cartridge 1 by detecting the film feeding condition from the movement of perforations thereof, the change in number of revolutions of the spool, or the like. Instead of this construction, by providing a sensor, for example, near the surface of a film rail, in the spool, etc., it is also possible to detect whether or not the film is outside the film cartridge 1.

Next, it is decided at step #104 whether or not the time t is greater than a predetermined value of time T1 which is set in advance. This value T1 is set as a value corresponding to the time during which the film is completely rewound inside the film cartridge 1 after the decision that the film is not outside the film cartridge 1; in other words, this value T1 is set as a value regarded as one during which the film is completely rewound up to the tip of its leader inside the cartridge 1.

Figure 7:
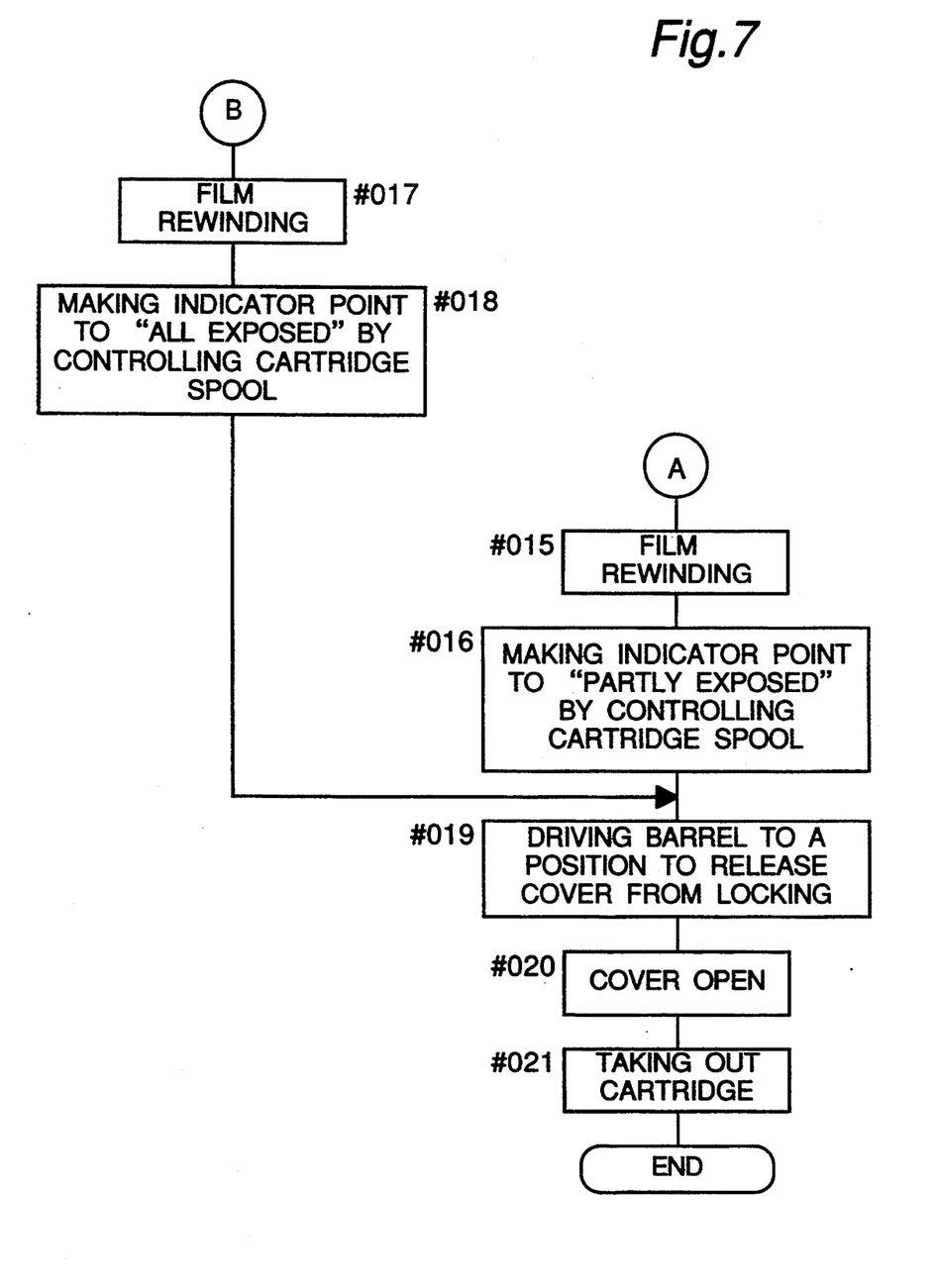
FIG. 7 is a flow chart showing an operation of the camera shown in FIG. 1.

At this step #104, if it is decided that the time t is greater than T1, after the abovementioned operation to display the mark corresponding to the "partly exposed" is performed at step #105, the rotatable barrel 7 is driven to the position to unlock the cartridge compartment case 3 at step #106, and then it proceeds to step #020 in FIG. 7.

Figure 9:
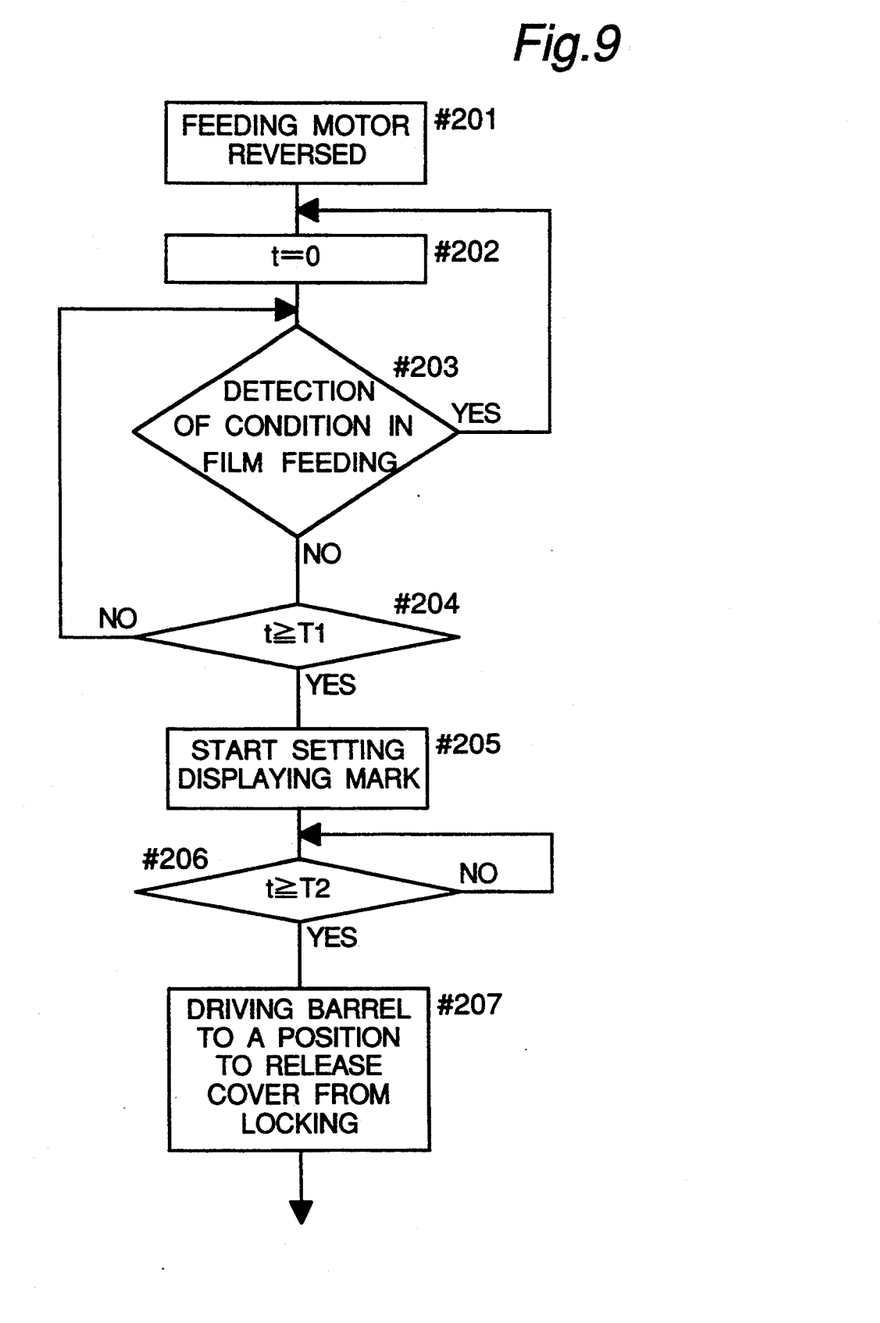
FIG. 9 is a flow chart according to another modified embodiment of the present invention.

The operation shown in the flow chart of FIG. 8 can be replaced by that shown in FIG. 9. That is, steps #201 through steps #204 shown in FIG. 9 correspond to the steps #101 through #104, respectively, and steps after the step #205 are different from those shown in FIG. 8. Here, a description of steps after the step #205 is made below.

If it is decided at step #204 that the time t is greater than the time T1, it proceeds to step #205 at which the abovementioned operation to display the mark starts to be performed. The control to display the mark can be performed by the same CPU as mentioned above, or a different CPU and hardware. Next, at step #206, it is decided whether or not the time t is greater than another predetermined value T2 which is set in advance. This value of time T2 is set as a value regarded as one by which time the abovementioned operation to display the mark is completed after the decision that the film is not outside the film cartridge 1 and at which it is possible to open the cartridge compartment case.

After deciding that the time t is greater than the time T2 at step #206, it proceeds to step #207 at which the rotatable barrel 7 is driven to the position to unlock the case.

As mentioned above, according to the present embodiment, whether the opening and closing lever 4 can be operated or not is limited and controlled by using the movement of the locking cam 8 provided in the photographing lens barrel 2; therefore, the cartridge compartment cover 3 is sure to be locked without employing any special actuator, and the film is sure to be prevented from being exposed to light even if the user improperly tries to handle the opening and closing lever 4.

Also, as shown in the embodiment, regarding such a type of camera as one employing a film cartridge being constructed in such a way that the film thereof is wound up to the tip of the leader inside the film case when the cartridge is not set inside a camera, if the user opens the cartridge compartment cover with the film being drawn outside the film case therein and tries to take out the film cartridge from the camera, there is a possibility that the film may tear. However, this tear of the film is sure to be prevented by using the mechanism for locking the cartridge compartment cover according to the embodiment.

Furthermore, as described above, the film cartridge is constructed so that the member having the indicator on it is integrally mounted to the cartridge spool and rotates together with it; so that marks of "exposed", "unexposed" or the like to display how the film is used are shown on the cartridge case; so that the indicator points to either of these displaying marks, depending upon the state thereof, by controlling the stopping position of the cartridge spool; and so that the film cartridge can be taken out of the camera only after the positioning of the indicator is completed. Consequently, any erroneous display of marks is sure to be prevented. According to the embodiment, it depends upon the position of the locking member 9, which limits the movement of the opening and closing lever 4, whether the cartridge compartment cover 3 can be locked or not. It will be recognized, however, that there are other equivalent ways of locking the cartridge compartment cover 3. For example, there can be provided an additional member, different from the opening and closing lever 4, for locking the cartridge compartment cover 3, and the additional member can be constructed so that the cover 3 is locked by moving the member by using the movement of the photographic lens barrel.

Figure 10:
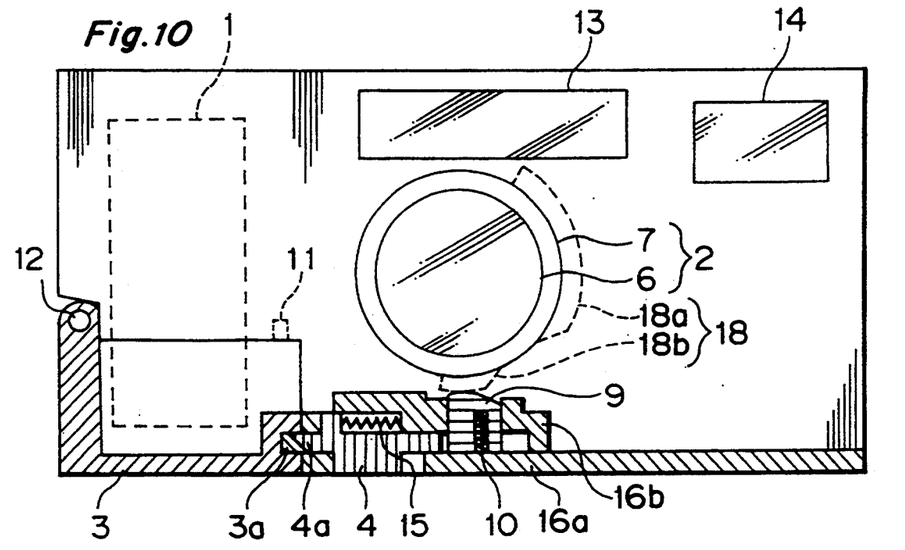
FIG. 10 is a partially sectional front view of a camera showing a mechanism for locking a cartridge compartment cover, according to the second embodiment of the present invention, with the cover being locked to the camera body.
Figure 11:
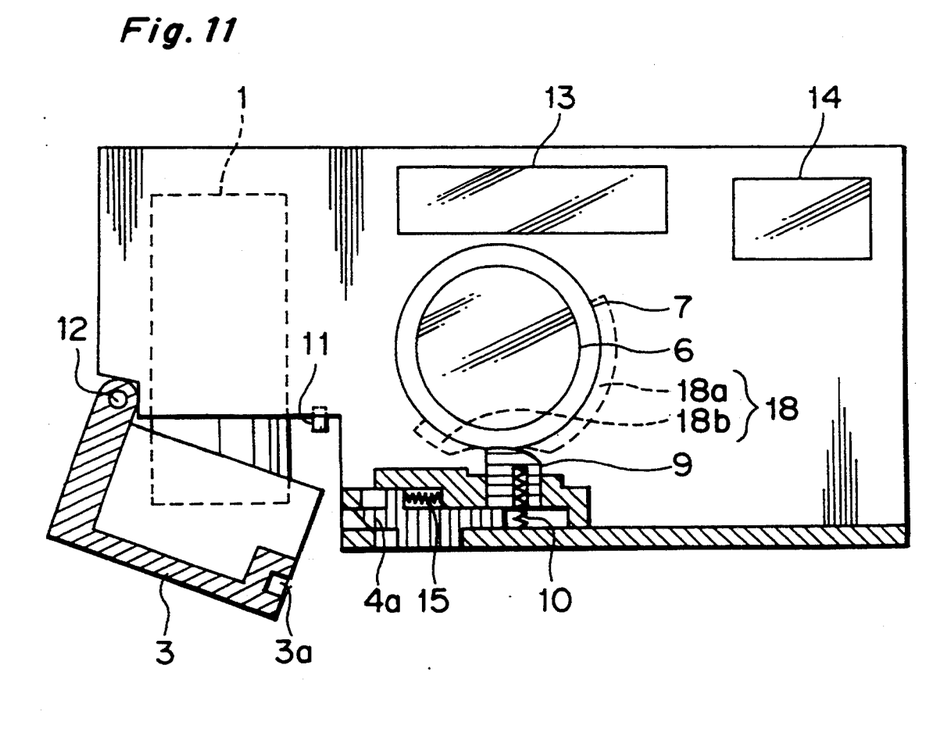
FIG. 11 is a partially sectional front view, similar to FIG. 10, showing that the cover is unlocked from the camera body.

Next, referring to FIGS. 10 and 11, a full description of a mechanism for locking a cartridge compartment cover of a camera according to a second embodiment of the present invention is made below. FIG. 10 is a fragmentary sectional front view showing this locking mechanism with the cover being closed, and FIG. 11 is a front view, similar to FIG. 10, showing the mechanism with the cover opening. In this embodiment, the cam has a shape different from that of the cam shown in the first embodiment. All parts except a locking cam 18 are, respectively, designated by the same reference numerals throughout both figures as those shown in the first embodiment, and a detailed description of the overlapping parts is omitted below.

The locking cam 18 comprises a first cam 18a and a second cam 18b. The cartridge compartment cover 3 is locked by the first cam 18a when the photographing lens is in the position for photographing; the cover 3 is locked by the second cam 18b at the time of switching the electric power off when the photographing lens sinks inside the camera body; and the cover 3 is unlocked by a peripheral outer surface of the rotatable barrel 7 between the first and second cams 18a and 18b. That is, according to the first embodiment, the cover 3 is unlocked by rotating the photographing lens barrel 2 in the direction opposite to the one in which the lens barrel 2 is driven from the position at which it sinks inside the camera body to the position for photographing, whereas, according to the second embodiment, the cover 3 is unlocked by rotating the rotatable barrel 7 of the lens barrel 2 from the position at which the barrel 2 sinks inside the camera body to the position for photographing, i.e., by rotating the rotatable barrel 7 in the clockwise direction as seen in FIGS. 10 and 11

In this second embodiment, the rotational direction of the motor M2 is set opposite to the rotational direction of the motor in the first embodiment for purposes of unlocking the cover 3, but achieves the same results as in the first embodiment. Also, in the first embodiment, it is necessary that the cam mechanism, provided between the rectilinear barrel 6 and the rotatable barrel 7 as mentioned above, have some region in which the rectilinear barrel 6 is not driven; however, in the second embodiment, it is not necessary to provide such a region in the cam mechanism.

The locking mechanism according to the present invention may be constructed in such a way that the locking mechanism is actuated, working with a lens barrel to change its focal length or a lens barrel to adjust its focal point.

Each of the above-mentioned embodiments illustrates that the mechanism for locking the cartridge compartment cover is adapted to function in conjunction with a camera employing the thrust-type of cartridge in which the film is wound around the spool up to the tip thereof inside the film case. It will be appreciated that the mechanism for locking the cartridge compartment cover according to the present invention is adapted for use in conjunction with a camera employing a 35 mm roll film.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera comprising:
   a camera body, the camera body including a cartridge compartment, the cartridge compartment having a cover, the cover being movable between an open and a closed position;
   a lock mechanism, the lock mechanism having a locking state in which the cover is prevented from being moved to the open position from the closed position, even if an operation to open the cover is executed, and an unlocking state in which the cover is movable from the closed position to the open position;
   a drive mechanism which drives a photographing lens: and
   an actuating mechanism, the actuating mechanism being movable between a first and a second position of the actuating mechanism by the drive mechanism, the actuating mechanism switching the lock mechanism to the locking state when the drive mechanism moves the actuating mechanism to the first position of the actuating mechanism, the lock mechanism being switched to the unlocking state when the drive mechanism moves the actuating mechanism to the second position of the actuating mechanism.

2. The camera according to claim 1, wherein the lock mechanism includes a locking member movable between a locking position, the cover being held in a closed position when the locking member is in the locking position, and an unlocking position, the cover movable to the open position when the locking member is in the unlocking position.

3. The camera according to claim 2, wherein the photographing lens is supported by a lens barrel driven by the drive mechanism, the locking member being moved between the locking position and the unlocking position when the drive mechanism moves the actuating mechanism between the first and the second position of the actuating mechanism, respectively.

4. The camera according to claim 1, wherein the drive mechanism moves the photographing lens between a photographing position, in which the photographing lens projects from the camera body and a retracted position, in which the lens is retracted from the photographing position into the camera body.

5. The camera according to claim 1, wherein the drive mechanism moves the photographing lens to change a focal length of the photographing lens.

6. The camera according to claim 1, wherein the drive mechanism moves the photographing lens to adjust a focal point of the photographing lens.

7. The camera according to claim 1, wherein the lock mechanism includes a manually operable knob member, the knob member being movable between a first position and a second position of the knob member, the first position and the second position of the knob member corresponding to the locking state and the unlocking state of the lock mechanism, respectively, and the camera body includes a first switch for detecting whether the knob member is in the first position or the second position of the knob member, a second switch for detecting whether the cover is in the open position or the closed position, and a third switch for detecting whether a film cartridge is loaded in the cartridge compartment, and wherein, when the first switch detects that the knob mechanism is in the first position of the knob mechanism, the second switch detects that the cover is in the closed position, and the third switch detects that a film cartridge is loaded in the cartridge compartment, the drive mechanism moves the actuating mechanism to the first position of the actuating mechanism.

8. The camera according to claim 1, further comprising a feeding mechanism for feeding film of a film cartridge loaded in the cartridge compartment to a first frame of the film after the cover is prevented from being moved from the closed position to the open position by the locking mechanism being switched to the locked state by the actuating mechanism.

9. The camera according to claim 1, wherein the cartridge compartment is configured to receive a film cartridge of a type having an indicator for indicating whether film in the cartridge is exposed or unexposed, the film being stored inside a cartridge case of the film cartridge with the film being wound up to a tip of a leader of the film inside the cartridge case.

10. The camera according to claim 9, wherein the lock mechanism includes a locking member movable between a locking position, the cover being held in a closed position when the locking member is in the locking position, and an unlocking position, the cover movable to the open position when the locking member is in the unlocking position.

11. The camera according to claim 10, wherein the photographing lens is supported by a lens barrel driven by the drive mechanism, the locking member being moved between the locking position and the unlocking position when the drive mechanism moves the actuating mechanism between the first and the second position of the actuating mechanism, respectively.

12. The camera according to claim 9, wherein the drive mechanism moves the photographing lens between a photographing position, in which the photographing lens projects from the camera body, and a retracted position, in which the photographing lens is retracted from the photographing position into the camera body.

13. The camera according to claim 9, wherein the drive mechanism moves the photographing lens to change a focal length of the photographing lens.

14. The camera according to claim 9, wherein the drive mechanism moves the photographing lens to adjust a focal point of the photographing lens.

15. The camera according to claim 9, wherein the lock mechanism includes a manually operable knob member, the knob member being movable between a first position and a second position of the knob member, the first position and the second position of the knob member corresponding to the locking state and the unlocking state of the lock mechanism, respectively, and the camera body includes a first switch for detecting whether the knob member is in the first position or the second position of the knob member, a second switch for detecting whether the cover is in the open position or the closed position, and a third switch for detecting whether a film cartridge is loaded in the cartridge compartment, and wherein, when the first switch detects that the knob mechanism is in the first position of the knob mechanism, the second switch detects that the cover is in the closed position, and the third switch detects that a film cartridge is loaded in the cartridge compartment, the drive mechanism moves the actuating mechanism to the first position of the actuating mechanism.

16. The camera according to claim 9, further comprising a feeding mechanism for feeding film of a film cartridge received in the cartridge compartment to a first frame of the film after the cover is prevented from being moved from the closed position to the open position by the locking mechanism being switched to the locked state by the actuating mechanism.

17. The camera according to claim 9, further comprising a rewind mechanism for rewinding film of a film cartridge received in the cartridge compartment, the rewind mechanism controlling a position of the indicator, when the rewind mechanism is operated where only a portion of the film has been exposed to light, such that the indicator indicates that the film is partly exposed.

18. The camera according to claim 9, further comprising a detect mechanism for detecting a terminal end of film of a film cartridge received in the cartridge compartment, and a rewind mechanism for rewinding the film when the detect mechanism detects the terminal end of the film, the rewind mechanism controlling a position of the indicator, when the rewind mechanism is operated after the detect mechanism detects the terminal end of the film such that the indicator indicates that the film is exposed.

19. A camera comprising:
a camera body, the camera body including a cartridge compartment, the cartridge compartment including a cartridge compartment cover, the cover being movable between an open and a closed position;
a locking mechanism movable between a locking position in which the cover is prevented from being moved from the closed to the open position and an unlocking position in which the cover is movable to the open position from the closed position;
a lens barrel, the lens barrel being movable between a photographing position in which the lens barrel projects from the camera body and a retracted position in which the lens barrel is retracted from the photographing position into the camera body; and
a lock control mechanism, the lock control mechanism being switchable between a first and a second position by the lens barrel when the lens barrel moves between the photographing and the retracted position, respectively, the lock control mechanism switching between the first and second position to switch the locking member between the locking position and the unlocking position, respectively, when the lens barrel moves between the photographing and the retracted position, respectively.

* * * * *